J. L. WOODBRIDGE.
SYSTEM OF ELECTRICAL DISTRIBUTION.
APPLICATION FILED NOV. 26, 1913.
1,189,768.
Patented July 4, 1916.
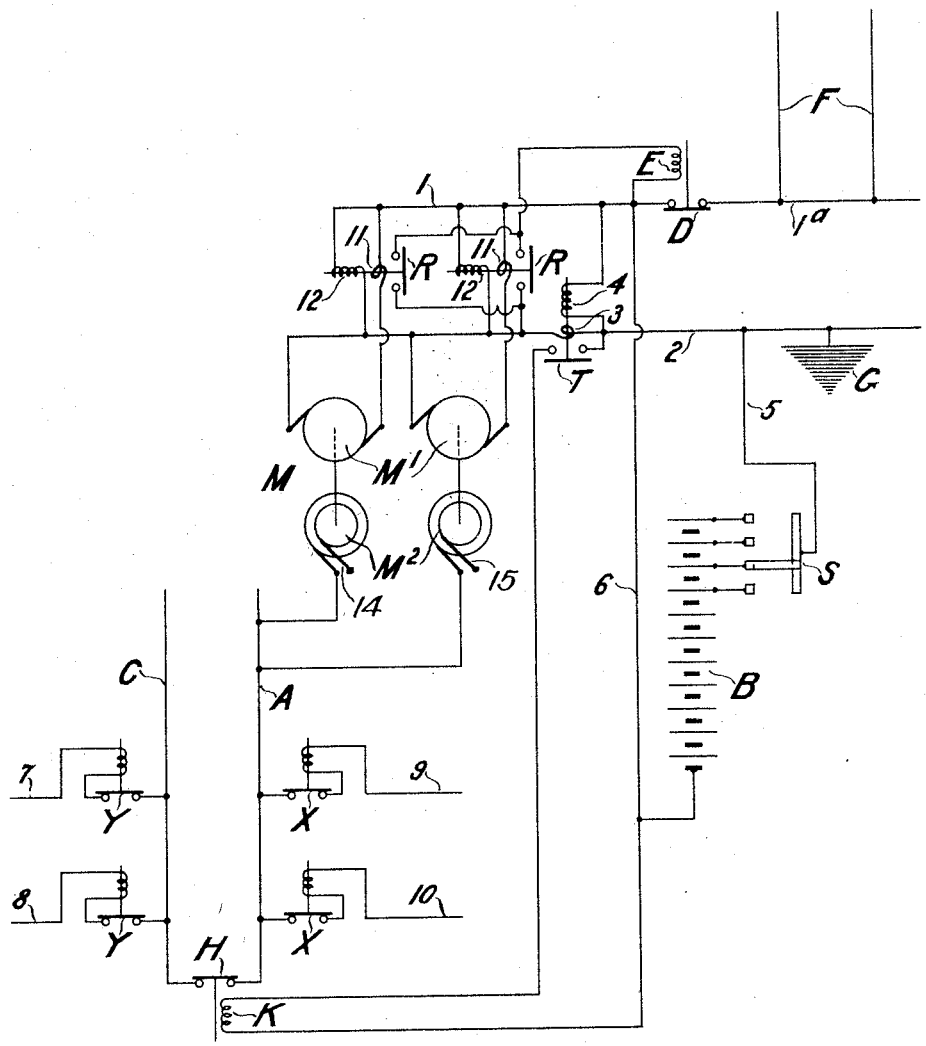
WITNESSES:
Joseph H Tracy
R. H. Whitestone Jr.
INVENTOR
J. Lester Woodbridge,
BY
Augustus B. Stoughton.
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,189,768. Specification of Letters Patent. Patented July 4, 1916.

Application filed November 26, 1913. Serial No. 803,126.

*To all whom it may concern:*

Be it known that I, JOSEPH LESTER WOODBRIDGE, a citizen of the United States, and a resident of Philadelphia, in the State of Pennsylvania, have invented certain new and useful Improvements in Systems of Electrical Distribution, of which the following is a specification.

My invention relates to systems in which alternating current translating devices are supplied from an alternating current source, and in which a storage battery is employed as a reserve source of power for supplying energy to the translating devices when the normal source of power is interrupted.

One of the principal objects of my invention is to provide means for maintaining an uninterrupted supply of energy to the translating device whereby even momentary interruptions for starting up the synchronous transforming apparatus or for throwing switches are obviated.

The accompanying drawing shows diagrammatically a system of distribution involving features of my invention.

In this drawing A represents one conductor of an alternating current distribution circuit, as, for example, one of the bus bars in a sub-station for the local distribution of current for lighting and power purposes. Only one phase of the alternating current system is shown for the sake of simplicity, but it will be understood that the conductor A, for example, may be one side of a single phase system or one phase of a three phase or other polyphase system. Another conductor C is also shown which may be another bus bar in the sub-station of the same phase as A, these two conductors being normally connected by an automatic switch H, whose function will be described later. To conductor C are connected the incoming supply feeders 7 and 8 by means of automatic overload circuit breakers Y Y. The two conductors 7 and 8 are of the same phase, the other phase or phases serving as a return circuit being omitted for clearness and to save mere duplication, and to avoid limiting the drawing to a definite number of phases which is immaterial. Two feeders are shown as it is customary to install duplicate lines in case of accident to one. To conductor A are connected the local distributing feeders 9 and 10 through automatic overload circuit breakers X X. These two conductors 9 and 10 are also of the same phase. The other phase or phases which will be connected through suitable return circuits to the machines $M^2$ by suitable brushes, such as 14 and 15, are omitted for clearness, and to save mere duplication, and to avoid limiting the drawing to a definite number of phases which is immaterial. In addition to the AC conductors A and C a DC circuit is shown, one side of which is represented by conductor 2, and the other side by conductors 1 and $1^a$. The last two conductors are connected by an automatic switch D whose function will be described later. The direct current circuit 1—2 is connected to the alternating circuit A by means of the motor generator sets shown at M. The direct current machines $M^1$ of these motor generator sets are connected across conductors 1—2, while the alternating current machines $M^2$, which are preferably of the synchronous type, are connected to the alternating current circuit A. A storage battery B is connected by means of conductors 5 and 6 and the end cell switch S across the direct current circuit 1—2. Direct current feeders F are shown connected to conductor $1^a$ which may be the ordinary over-head feeders of a trolley system whose return circuit is completed through the ground connection G.

The automatic switch H which connects conductors A and C is provided with a trip coil K energized by a reverse current relay T whose actuating coil 3 is connected into the DC conductor 2. This relay T is also provided with a coil 4 connected across the circuit 1—2. It will be seen that the coil 3 carries the total output of the motor generators M, and the design is such that when these motor generators are delivering energy to the DC circuit, coil 3 will oppose coil 4 and the relay T will remain open. When the current in coil 3 reverses, however, and reaches a certain value in the reverse direction coils 3 and 4 will coöperate and their united effect will be sufficient to close the relay T and trip the automatic switch H. This reversal of current in coil 3 may be brought about by discharge current from the battery B passing back through conductor 2 into the direct current machines of the motor generator sets.

Automatic switch D, as explained above, connects conductor 1 with conductor $1^a$, and so long as this switch is closed a source of current is provided either from the motor generators or the battery to supply the feeders F. If, however, the switch D is opened the load due to the feeders F will be entirely cut off of the motor generators and battery. The switch D is provided with a trip coil E which may be energized by the closing of either of the two overload relays R in the circuits of the motor generator sets. Each relay R is provided with a series coil 11 carrying the output of the corresponding generator, and a shunt coil 12 connected directly across the circuit 1—2. The coils 11 and 12 are so designed that they coöperate to close the relay when the output from the generator $M^1$ to the circuit 1—2 reaches a certain maximum. However, when the direction of energy transfer is reversed so that energy is being transferred from the DC circuit 1—2 to the AC circuit A it will require a considerably greater current flowing in the coil 11 to close the relay R since the coil 12 will then oppose coil 11. The operation of the system is as follows:

Normally the overload circuit breakers X and Y and the automatic switch H are in the closed position, and power is being supplied by the incoming feeders 7 and 8 to the local AC distribution circuits 9 and 10 and also through the motor generators M to the direct current circuit 1—2 and feeders F. A part of the energy transferred by the motor generators M may also be delivered to the battery B. In case of any interruption in the supply of energy over the feeders 7 and 8 or in case of any severe disturbance on these circuits, the direction of energy transmission through the motor generators M will be reversed, the battery being called upon to discharge to supply this energy. This reversal will close the relay T and trip the automatic switch H, thus disconnecting conductor C from conductor A. If the cause of the disturbance were, for example, a short-circuit on one of the feeders 7 or 8 or on some remote part of the system connected to these feeders, the opening of the switch H will disconnect that part of the system which is in trouble from the local distribution circuit A, which will now be supplied with power from the storage battery through the motor generator sets M operating inverted. These results will all occur without any interruption of power supply on the circuit A.

The function of the relays R in the circuits of the generator $M^1$ is to relieve these machines of overload due, for example to excessive demands on the feeders F without, at the same time, disconnecting the machines $M^1$ from the battery B. While these relays R are connected into the circuits of the generators M they serve to trip the automatic switch D by energizing its trip coil E and the opening of this switch disconnects conductor $1^a$ and the feeders F without disconnecting the generators $M^1$ from the battery B. The object of the coils 12 on the relays R is to permit the generators to carry a greater overload when operating inverted without tripping the switch D. The condition of inverted operation being an emergency condition it may be permissible to subject the motor generators M to greater overloads than under normal conditions of operation.

What I claim and desire to secure by Letters Patent is—

1. A system of electrical distribution comprising the combination of an alternating current consumption circuit, a direct current supply circuit having a storage battery, converting apparatus for connecting these circuits, an alternating current supply circuit normally connected to the alternating current consumption circuit, a direct current work circuit normally connected to the direct current supply circuit and means responsive to the direction and rate of energy transfer between the alternating current consumption and the direct current supply circuits, and adapted to automatically disconnect the alternating current supply and the direct current work circuits without interrupting the connection between the battery and the alternating current consumption circuit, whereby the alternating current consumption circuit is uninterruptedly supplied with energy, substantially as described.

2. A system of electrical distribution comprising the combination of an alternating current consumption circuit, a direct current supply circuit having a storage battery, converting apparatus for connecting these circuits, an alternating current supply circuit normally connected to the alternating current consumption circuit, a direct current work circuit normally connected to the direct current supply circuit, means responsive to reversal of energy transfer between the alternating current consumption and the direct current supply circuits for automatically disconnecting the alternating current supply circuit, and means responsive to the rate of transfer of energy for automatically disconnecting the direct current work circuit, without interrupting the supply of energy from the battery to the alternating current consumption circuit.

3. A system of electrical distribution comprising the combination of an alternating current supply circuit, an alternating current consumption circuit normally connected thereto and supplied therefrom, a direct current circuit having a normally floating storage battery, converting apparatus connected between the alternating current consumption circuit and the direct current circuit for normally supplying the latter from the former, and means responsive to reversal of energy transfer between the alternating current consumption and the direct current circuits, and adapted to automatically disconnect the alternating current supply circuit and permit the storage battery to discharge through said converting apparatus to the alternating current consumption circuit to maintain the latter without interruption.

4. In combination a direct current supply system including alternating-direct-current converting apparatus and a storage battery connected in multiple, an alternating current distribution system adapted to transfer a part of its energy to the direct current supply system through the converting apparatus, an alternating current supply system adapted to deliver energy to the alternating current distribution system, a switch between the alternating current supply system and the alternating current distribution system, and means dependent on the rate and direction of energy transfer between the alternating current distribution system and the direct current supply system for opening the switch.

5. In combination a direct current supply system including alternating-direct-current converting apparatus and a storage battery connected in multiple, a direct current load circuit connected to the direct current supply system, an alternating current distribution system adapted to transfer a part of its energy to the direct current supply system through the converting apparatus, an alternating current supply system, adapted to deliver energy to the alternating current distribution system, a switch between the alternating current supply system and the alternating current distribution system, means dependent upon the rate and direction of energy transfer between the alternating current distribution system and the direct current supply system for opening said switch, a second switch between the direct current load circuit and the direct current supply system, and means dependent on the rate and direction of energy transfer in the alternating-direct-current converting apparatus for opening the last mentioned switch.

6. An alternating current distribution system, a direct current supply circuit, converting apparatus adapted to transfer energy in either direction between them, a storage battery connected to the direct current supply circuit, a direct current work circuit normally connected to the direct current supply circuit and means responsive to the rate of energy transfer through the converting apparatus and adapted to disconnect the direct current work circuit without disconnecting the storage battery from said converting apparatus.

7. An alternating current distribution system, a direct current supply circuit, a plurality of converting means connected in parallel relation between them, a storage battery connected to the direct current supply circuit, a direct current work circuit normally connected to the direct current supply circuit and means responsive to the rate of energy transfer through each converting means and adapted to disconnect the direct current work circuit without disconnecting the storage battery from the converting means.

In testimony whereof, I have hereunto signed my name.

JOSEPH LESTER WOODBRIDGE.

Witnesses:
J. H. TRACY,
R. A. WHITSTONE, Jr.

Copies of this patent may be obtained for five cents each, by addressing the "Commissioner of Patents, Washington, D. C."